Patented Apr. 24, 1951

2,550,651

UNITED STATES PATENT OFFICE 2,550,651

CYCLOHEXENE PHOSPHONATES AND THEIR PREPARATION

Joseph B. Dickey, Harry W. Coover, Jr., and Newton H. Shearer, Jr., Rochester, N. Y., assignors to Eastman Kodak Company, Rochester, N. Y., a corporation of New Jersey No Drawing. Application July 9, 1949, Serial No. 103,952

11 Claims. (Cl. 260—461)

This invention relates to the preparation of cyclohexene phosphonates by the reaction of butadiene or substituted butadienes with vinyl phosphonates or substituted vinyl phosphonates and the products resulting therefrom.

Esters of phosphorus-containing acids have become of decided interest lately in various connections, particularly for insecticidal or fungicidal purposes. Also, the esters of phosphorus-containing acids have shown themselves to be useful as plasticizers for cellulose esters and for certain types of vinyl polymers.

An object of our invention is to provide a new type of esters of phosphorus-containing acids. Another object of our invention is to provide esters of phosphorus-containing acids, the acid radical of which contains a ring structure therein. A further object of our invention is to provide a method of making phosphorus-containing esters in which butadiene is employed as the starting material. A still further object of our invention is to provide novel chemical compounds which are useful for plasticizing polymeric materials and for insecticidal or fungicidal purposes. Other objects of our invention will appear herein.

We have found that cyclohexene phosphonates can be readily prepared by the reaction of a conjugated diene, such as butadiene or a substituted butadiene, with a vinyl phosphonate or a substituted vinyl phosphonate. The reaction which occurs is as follows:

$$YCH=CXPO(OR)_2 + CZ_2=CZ-CZ=CZ_2 \longrightarrow$$

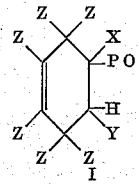

The compounds comprising this invention are represented by the formula of the finished product in the above equation wherein Y is a hydrogen atom, a carbalkoxy group or a nitrile group; X is hydrogen or alkyl; R is alkyl; and Z is hydrogen or alkyl. The preparation of these compounds is carried out by heating together the reactants such as at a temperature within the range of 100–250° C. for a time within the range of 1–10 hours. After the reaction has occurred, the cyclohexene phosphonates formed are isolated therefrom by distillation under reduced pressure.

The conjugated dienes which may be employed as reactants may be butadiene or it may be a substituted butadiene. In addition to butadiene some of the compounds which are useful in this connection are the following:

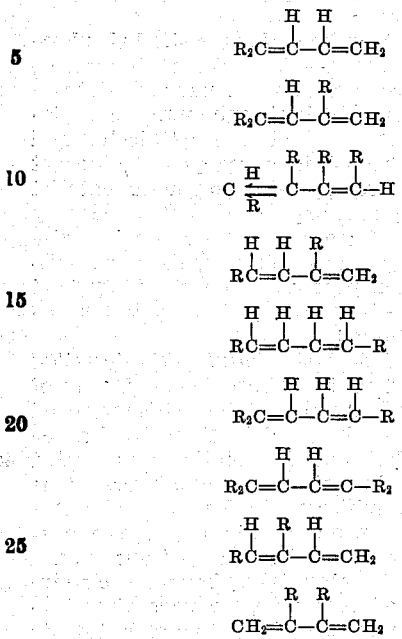

In the above formulas the alcohol groups may be any alkyls up to 18 carbon atoms, but the compounds which are most readily available and the easiest to work with contain only alkyl groups of 1–4 carbon atoms, particularly methyl and ethyl. Therefore, usually it is desirable in preparing cyclohexene phosphonates to use either butadiene or a dimethyl or diethyl butadiene unless a compound of some particular structure is desired.

The vinyl or substituted vinyl phosphonates which may be employed as the starting material in reactions in accordance with our invention correspond with the formula $$YCH=CXPO(OR)_2$$

Y may be either a hydrogen atom, a carbalkoxy group such as carbomethoxy or carboethoxy or a nitrile group such as CN; X may be either hydrogen or alkyl; whereas R in each instance is an alkyl group. Although in these compounds it is preferred that the alkyl groups be of 1–4 carbon atoms, here again the alkyl groups may have any number of carbon atoms up to 18. When these two reactants are heated together as described herein, ring formation occurs and the resulting products obtained are cyclohexene phosphonate esters, the substituents being arranged around the ring as shown in the type reaction given herein.

The compounds prepared in accordance with our invention exhibit insecticidal and/or fungicidal properties and, therefore, are useful in circumstances wherein those properties are desired. Also, these compounds when mixed with cellulose esters or vinyl acetate or similar polymers exhibit a plasticizing action making those polymers more readily workable. The cyclohexene phosphonates prepared in accordance with our invention can be mixed with inert powder such as powdered diatomaceous earth or finely divided sulfur and can be employed as a dust to protect plant life against harmful insect pests. If desired, instead of applying in the form of a dust the cyclohexene phosphonate can be dissolved in a like petroleum distillate and employed in emulsion form for insecticidal purposes.

The following examples illustrate the preparation of cyclohexene phosphonates in accordance with our invention:

*Example 1.—5-carbomethoxy-4-diethyl phosphonato cyclohexene.*—15 parts of butadiene, 0.2 part of hydroquinone and 7 parts of diethyl-β-carbomethoxy-vinyl phosphonate were dissolved in 50 parts of absolute ethyl alcohol and the mass was heated in a sealed container at 100° C. for 10 hours. A white, polymeric material formed which was separated from the mass by filtration. The filtrate was fractionally distilled and the product being collected at 115–118° C. at 1 mm. pressure. A yield of 70% of 5-carbomethoxy-4-diethyl phosphonato cyclohexene was obtained.

*Example 2.—4-diethyl phosphonato-4-methyl cyclohexene.*—12 parts of butadiene, 0.2 part of hydroquinone and 9 parts of diethyl isopropenyl phosphonate were dissolved in 40 parts of absolute ethyl alcohol and the solution was heated in a closed container at 200° C. for 7 hours. The mass was then subjected to fractional distillation at reduced pressure whereby the above-named product was obtained in good quantity.

*Example 3.—4-diethyl phosphonato cyclohexene.*—10 parts of butadiene, 0.2 part of hydroquinone and 7 parts of diethyl vinyl phosphonate were placed in an autoclave and heated at 150° C. for 5 hours. The resulting material was subjected to fractional distillation and a considerable amount of the above-named product was obtained.

In the above examples other compounds which have been mentioned as suitable in this reaction may be substituted in commensurate quantities in the above examples to obtain the desired products. For instance, instead of butadiene, 2,3-dimethyl butadiene or any of the other conjugated dienes specified herein may be employed, the compounds used as starting materials being governed by the products which are desired, the compounds to be used being determined by reference to the general equation which has been given in this specification.

We claim:

1. A method for preparing cyclohexene phosphonates which comprises heating together at 100–250° C. for 1–10 hours a compound having the formula $CZ_2=CZ-CZ=CZ_2$, Z being selected from hydrogen and alkyl with a compound having the formula

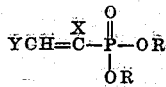

R being alkyl, X being selected from the group of hydrogen and alkyl and Y being selected from the group of hydrogen, carbalkoxy and nitrile.

2. A method for preparing cyclohexene phosphonates which comprises heating together at 100–250° C. for 1–10 hours butadiene and a compound having the formula

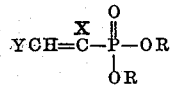

R being alkyl, X being selected from the group of hydrogen and alkyl and Y being selected from the group of hydrogen, carbalkoxy and nitrile.

3. A method for preparing cyclohexene phosphonates which comprises heating together at 100–250° C. for 1–10 hours a compound having the formula $CZ_2=CZ-CZ=CZ_2$, Z being selected from the group of hydrogen and alkyl and diethyl vinyl phosphonate.

4. A method for preparing cyclohexene phosphonates which comprises heating together at 100–250° C. for 1–10 hours butadiene and diethyl vinyl phosphonate.

5. A method for preparing cyclohexene phosphonates which comprises heating together at 100–250° C. for 1–10 hours butadiene and diethyl isopropenyl phosphonate.

6. A method for preparing cyclohexene phosphonates which comprises heating together at 100–250° C. for 1–10 hours butadiene and diethyl-β-carbomethoxy-vinyl phosphonate.

7. A compound having the formula

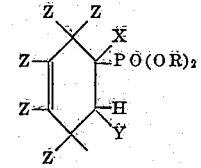

X and Z being selected from the group of hydrogen and alkyl, R being alkyl and Y being selected from the group of hydrogen, carbalkoxy and nitrile.

8. A compound having the formula

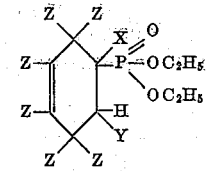

X and Z being selected from the group of hydrogen and alkyl and Y being selected from the group of hydrogen, carbalkoxy and nitrile.

9. Diethyl phosphonato cyclohexene.
10. Diethyl phosphonato-methyl cyclohexene.
11. Diethyl phosphonato-carbomethoxy cyclohexene.

JOSEPH B. DICKEY.
HARRY W. COOVER, Jr.
NEWTON H. SHEARER, Jr.

REFERENCES CITED

The following references are of record in the file of this patent:

UNITED STATES PATENTS

| Number | Name | Date |
| --- | --- | --- |
| 2,439,214 | Lindsey | Apr. 6, 1948 |